Patented Nov. 11, 1947

2,430,678

UNITED STATES PATENT OFFICE 2,430,678

QUINOLINE THIOLS

Glenn L. Jenkins, La Fayette, and John E. Christian, West Lafayette, Ind., assignors to Purdue Research Foundation, West Lafayette, Ind., a corporation of Indiana No Drawing. Application December 1, 1944, Serial No. 566,251

1 Claim. (Cl. 260—288)

This invention relates to new organic compounds and more particularly to quinoline thiols.

The compounds of this invention may be represented by the following general formula:

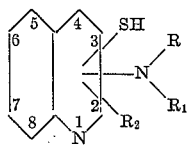

wherein R represents hydrogen, a phenyl, benzyl, phenethyl radical, an alkyl radical having from - to 6 carbon atoms, or a dialkyl amino alkyl radical whose alkyl groups have from 1 to 6 carbon atoms; $R_1$ represents hydrogen, a benzoyl radical, or an aliphatic acyl radical having from 1 to 6 carbon atoms; and $R_2$ represents hydrogen, halogen, a hydroxy, methoxy, ethoxy radical, or an alkyl radical having from 1 to 6 carbon atoms. In the above formula the substituents may be located in any one of the positions 2, 3, 4, 5, 6, 7, and 8 on the quinoline ring, with no more than one substituent at any of these positions at any one time.

Our new compounds comprise quinoline thiols wherein the quinoline nucleus is substituted by an amino group or substituted amino group and additionally may be substituted by a member of the group of compounds comprising $R_2$ as given above.

Compounds of our invention have reducing properties by reason of the presence of the thiol or sulfhydryl group.

The sulfhydryl group in reacting with an oxidizing agent is oxidized to a disulfide group unless the oxidizing agent is extremely powerful, in which case the sulfhydryl group is oxidized to a sulfinic or a sulfonic acid. It may be noted, however, that in reaction with a strong oxidizing agent the amino group must be protected; otherwise the oxidizing agent will destroy the quinoline nucleus by attacking it through the easily oxidizable amino group.

The compounds of this invention are amphoteric in nature. Thus, the sulfhydryl group is an acid group and may combine with alkali metal ions to form water-soluble salts such as sodium and potassium salts and may combine with heavy metal ions to form water-insoluble salts. The quinoline nucleus, on the other hand, which contains a tertiary nitrogen, is basic in nature. Furthermore the amino group is basic unless it is substituted by an acyl group. The compounds therefore readily may form acid addition salts, the acids combining with the nitrogen of the quinoline nucleus and also with the amino group provided that the latter is not substituted by an acyl group. Thus, soluble acid addition salts may be formed such as the hydrochloride, hydrobromide, and sulfate. Additionally, insoluble acid addition salts may be prepared such as the ortho benzoylbenzoate and the dicyclohexyl sulfamate.

In preparing compounds of this invention, it is convenient to use certain halogen compounds as starting materials. Thus, a substituted quinoline halide may be reacted with a metal disulfide to produce a substituted diquinolyl disulfide which subsequently may be reduced to form the sulfhydryl compound or subsituted quinoline thiol. Alternatively, the substituted quinoline halide may be reacted with a metal hydrosulfide whereby the substituted quinoline thiol is obtained directly.

In connection with the use of a substituted quinoline halide as a starting material in preparing these compounds, it should be borne in mind that the halogen atom when located at any one of the positions 3, 5, 6, 7, and 8 of the quinoline nucleus is relatively inactive and will not readily react with metal hydrosulfides or metal disulfides. It is therefore desirable to locate within the molecule some group which has an activating effect upon the halogen. Among groups which may be used for this purpose is the nitro group when located in a position ortho or para to the halogen atom. The presence of the nitro group may serve the purposes both of activating the halogen and of supplying the nitrogen for the amino group. However, the nitro group used for the activation of the halogen need not be the source of the amino group, but may be replaced by chemical conversions to one of the groups which comprise $R_2$, or after having served its purpose as an activating agent it may be completely removed from the quinoline ring by chemical means.

An amino group which may be protected by some substituent may be present in the halogen substituted molecule before reaction of the substituted quinoline halide with a metal hydrosulfide or a metal disulfide. After the reaction has been carried out, it is a matter of choice whether the amino group should be left protected or the protecting group removed to liberate the free amino group.

Among nitro compounds suitable for the synthesis of compounds of this invention in accordance with the generalizations given above may be mentioned the following, which are listed with accompanying literature references:

5-chloro-6-methoxy-8-nitroquinoline, Ann. Inst. Pasteur 44, 719
5-chloro-8-nitroquinoline, Bull. Soc. Chim. 47, 571 (1930)
2-chloro-6-nitroquinoline, J. Prakt. Chem. 93, 381 (1916)
2-chloro-5-nitroquinoline, J. Prakt. Chem. 93, 383, 1916
2-chloro-8-nitroquinoline, J. Prakt. Chem. 93, 376 (1916)
8-chloro-5-nitro-2,4-dimethylquinoline, J. Chem. Soc. 1927, 1932
5-bromo-6-nitroquinoline, Rec. Trav. Chim. 48, 550 (1929)
6-chloro-5-nitroquinoline, Bull. Soc. Chim. 47, 738 (1930)
6-chloro-7-nitroquinoline, Bull. Soc. Chim. 47, 738 (1930)
7-chloro-6-nitroquinoline, Bull. Soc. Chim. 47, 738 (1930)
2-chloro-8-nitro-6-methylquinoline, J. Chem. Soc. 1931, 2195
7-chloro-8-nitroquinoline, Ann. Inst. Pasteur 44, 719 (1930)
2-chloro-6-nitro-4-methylquinoline, J. Chem. Soc. (1930) 2346
2-chloro-3-nitro-4-chloroquinoline, Ber. 51, 1500

The following examples illustrate compounds of our invention and methods of preparing the same.

*Example 1*

5-amino-6-methoxy-8-quinoline thiol represented by the formula

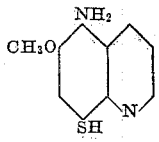

may be prepared from 5-nitro-6-methoxy-8-chloroquinoline by the following method:

21 g. of 5-nitro-6-methoxy-8-chloroquinoline are dissolved in about 250 cc. of alcohol. The solution is refluxed and 5.5 g. of sodium disulfide, dissolved in a minimum amount of water, added slowly. The refluxing is continued for two hours, and the reaction mixture is treated with water whereupon a precipitate of 5,5′-dinitro-6,6′-dimethoxy-8,8′-diquinolyl disulfide separates. 5 g. of the 5,5′-dinitro-6,6′-dimethoxy-8,8′-diquinolyl disulfide are dissolved in a mixture of 75 cc. of glacial acetic acid and 30 cc. of concentrated hydrochloric acid, and 15 g. of zinc dust added in small portions. When all of the zinc dust is completely dissolved, the solution is evaporated to dryness in vacuo and the solid residue redissolved in 100 cc. of 4 percent aqueous sodium hydroxide solution. Hydrogen sulfide is passed through the solution to precipitate zinc sulfide which is then removed by filtration. The filtrate is neutralized with hydrochloric acid, whereupon a precipitate of the desired 5-amino-6-methoxy-8-quinoline thiol is obtained.

*Example 2*

5-amino-6-methoxy-8-quinoline thiol may also be prepared from 5-nitro-6-methoxy-8-chloroquinoline by reaction of the substituted quinoline halide with sodium hydrosulfide in the following manner:

21 g. of 5-nitro-6-methoxy-8-chloroquinoline are dissolved in 250 cc. of alcohol. This solution is refluxed and a constant stream of nitrogen is passed over the refluxing solution during the addition of a concentrated aqueous solution of 5.6 g. of sodium hydrosulfide. Refluxing is continued for about two hours and the bulk of the alcohol is then evaporated off in vacuo. Upon addition of water, a precipitate of 5-nitro-6-methoxy-8-quinoline thiol is obtained. 5 g. of the 5-nitro-6-methoxy-8-quinoline thiol are dissolved in a mixture of 100 cc. of acetic acid and 30 cc. of concentrated hydrochloric acid, and 10 g. of zinc dust added in small portions. When all of the zinc dust is completely dissolved, the solution is evaporated to dryness in vacuo and the solid residue redissolved in 100 cc. of 4 percent aqueous sodium hydroxide in solution. Hydrogen sulfide is then passed through the solution to precipitate zinc sulfide which is removed by filtration. The filtrate is neutralized with hydrochloric acid, whereupon a precipitate of desired 5-amino-6-methoxy-8-quinoline thiol is obtained.

*Example 3*

6-acetylamino-4-quinoline thiol represented by the formula

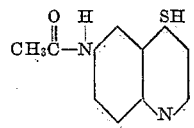

may be prepared from 2-chloro-6-acetylaminoquinoline in the following manner:

22 g. of 4-chloro-6-acetylaminoquinoline are dissolved in 250 cc. of alcohol. This solution is refluxed and a constant stream of nitrogen is passed over the refluxing solution during the addition of a solution of 5.6 g. of sodium hydrosulfide dissolved in a minimum amount of water. Refluxing is continued for about four hours, and about two-thirds of the alcohol is removed in vacuo. Upon treatment of the residual solution with about twice its volume of water and cooling to about 0° C., a precipitate of 6-acetylamino-4-quinoline thiol is obtained.

*Example 4*

6-methoxy-8-acetylamino-5-quinoline thiol represented by the formula

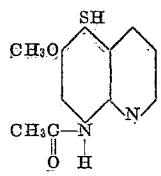

may be prepared from 5-chloro-6-methoxy-8-nitroquinoline in the following manner:

24 g. of 5-chloro-6-methoxy-8-nitroquinoline are dissolved in about 250 cc. of alcohol. The solution is refluxed and a concentrated aqueous solution of 5.5 g. of sodium disulfide is added slowly. Refluxing is continued for about two hours. Water is then added to the reaction mixture whereupon a precipitate of a nitro compound, 6,6′-dimethoxy-8,8′-dinitro-5,5′-diquinolyl disulfide, separates. 3 g. of the 6,6′-dimethoxy-8,8′-dinitro-5,5′-diquinolyl disulfide are added to a solution of 12 g. of stannous chloride dissolved in 30 cc. of concentrated hydrochloric acid and the solution heated at about 80° C. for about one-half hour. Upon cooling to about 0° C., there is formed a precipitate comprising the tin double salt of a 6-methoxy-8-amino-5-quinoline thiol. The precipitate is filtered off, treated with about 25 cc. of 50 percent sodium hydroxide solution and diluted to about 150 cc. with water. About 10 g. of sodium bisulfite are then added and air passed through the solution, whereupon a precipitate of 6,6'-dimethoxy-8,8'-diamino-5,5'-diquinolyl disulfide slowly forms and separates.

The precipitate of 6,6'-dimethoxy-8,8'-diamino-5,5'-diquinolyl disulfide is dissolved in about 10 cc. of acetic anhydride and the solution refluxed for about 15 minutes. Upon cooling there forms a precipitate of 6,6'-dimethoxy-8,8'-diacetylamino-5,5'-diquinolyl disulfide. This precipitate is not separated from the supernatant liquid but is treated with a mixture of 100 cc. of acetic acid and 30 cc. of concentrated hydrochloric acid. 5 g. of zinc dust are then added slowly in small portions. Upon solution of all of the zinc dust, the solution is evaporated to dryness. The solid residue is dissolved in about 100 cc. of 4 percent aqueous sodium hydroxide solution and hydrogen sulfide is passed through the solution to precipitate zinc sulfide, which is filtered off. The filtrate is neutralized with hydrochloric acid, whereupon the desired 6-methoxy-8-acetylamino-5-quinoline thiol is precipitated.

We claim as our invention:
5-amino-6-methoxy-8-quinoline thiol having the following formula:

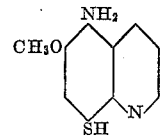

GLENN L. JENKINS.
JOHN E. CHRISTIAN.

REFERENCES CITED

The following references are of record in the file of this patent:

UNITED STATES PATENTS

| Number | Name | Date |
|---|---|---|
| 2,189,717 | Scott | Feb. 6, 1940 |

OTHER REFERENCES

Journal Amer. Chem. Soc., vol. 62, pp. 173–174 and pp. 3509–3510 (1940).

Certificate of Correction

Patent No. 2,430,678.   November 11, 1947.

GLENN L. JENKINS ET AL.

It is hereby certified that error appears in the printed specification of the above numbered patent requiring correction as follows: Column 1, line 14, after the word "from" strike out the hyphen and insert instead the numeral *1*; and that the said Letters Patent should be read with this correction therein that the same may conform to the record of the case in the Patent Office.

Signed and sealed this 6th day of January, A. D. 1948.

[SEAL]

THOMAS F. MURPHY,
*Assistant Commissioner of Patents.*